(12) United States Patent
Webster

(10) Patent No.: US 10,504,113 B2
(45) Date of Patent: Dec. 10, 2019

(54) METHOD AND APPARATUS FOR PROVIDING PRE-CERTIFICATION FOR CHIP CARD MOBILE MERCHANT PAYMENTS

(71) Applicant: CARDFLIGHT, INC., New York, NY (US)

(72) Inventor: Derek Webster, New York, NY (US)

(73) Assignee: CARDFLIGHT, INC., New York, NY (US)

( * ) Notice: Subject to any disclaimer, the term of this patent is extended or adjusted under 35 U.S.C. 154(b) by 588 days.

(21) Appl. No.: 15/255,207

(22) Filed: Sep. 2, 2016

(65) Prior Publication Data

US 2017/0068957 A1  Mar. 9, 2017

Related U.S. Application Data

(60) Provisional application No. 62/214,023, filed on Sep. 3, 2015.

(51) Int. Cl.
*G06Q 20/40* (2012.01)
*G06Q 20/34* (2012.01)
*G06Q 20/38* (2012.01)

(52) U.S. Cl.
CPC ......... *G06Q 20/401* (2013.01); *G06Q 20/341* (2013.01); *G06Q 20/38215* (2013.01)

(58) Field of Classification Search
CPC ............... G06Q 20/401; G06Q 20/341; G06Q 20/38215
See application file for complete search history.

(56) References Cited

U.S. PATENT DOCUMENTS

2010/0131413 A1* 5/2010 Kranzley ............. G06Q 20/105
705/66

* cited by examiner

*Primary Examiner* — Kristy A Haupt
(74) *Attorney, Agent, or Firm* — Volpe and Koenig, P.C.

(57) ABSTRACT

A method and apparatus for pre-certifying a chip card transaction, includes receiving, by a server, a request for processing the chip card transaction from a first device. The server authenticates the first device and one or more devices involved in the transaction for processing the transaction. If the first device and all of the one or more devices are authenticated, the transaction is processed and data relating to the processed transaction is transmitted to the first device.

12 Claims, 6 Drawing Sheets

METHOD AND APPARATUS FOR PROVIDING PRE-CERTIFICATION FOR CHIP CARD MOBILE MERCHANT PAYMENTS

CROSS REFERENCE TO RELATED APPLICATIONS

This Application claims the benefit of U.S. Provisional Application Ser. No. 62/214,023, filed Sep. 3, 2015, the contents of which are incorporated herein as if fully set forth.

FIELD OF INVENTION

The present disclosure relates to virtual payments, and in particular to a pre-certified chip card mobile merchant method and apparatus.

BACKGROUND

The rise of "popup" merchants in malls, at festivals, and at other functions has given rise to a need to provide payment solutions. In the past, one might have been required to pay only in cash at these merchants. However, with the advent of electronic devices that have significant functionality and connectability, a smartphone, tablet, or other device, can be equipped to take credit card payments conveniently. Mobile merchants, therefore, utilize devices such as card readers and associated applications to accept credit cards.

In order to combat credit card fraud, modern credit cards are often equipped with chip technology for greater security. This chip technology includes information about the credit card that may be utilized in a chip card, (e.g., EMV), transaction. In order to perform a chip card transaction, an application must individually certify with multiple payment card brands.

Accordingly, it would be beneficial to provide a method and apparatus to provide to a mobile merchant an application to accept chip card transactions without the mobile merchant needing to individually certify with multiple payment card brands.

SUMMARY

A method and apparatus for providing pre-certification for chip card mobile merchant payments is disclosed. The method includes receiving, by a server, a request for processing the chip card transaction from a first device. The server authenticates the first device and one or more devices involved in the transaction for processing the transaction. If the first device and all of the one or more devices are authenticated, the transaction is processed and data relating to the processed transaction is transmitted to the first device. If the first device and all of the one or more devices are not authenticated, the transaction request is rejected.

An apparatus is disclosed. The apparatus includes a processor, an input/output (I/O) driver, and a memory. The processor is configured to receive a first transmission from a first device from the I/O driver via the Internet. The first transmission includes a request for processing a chip card transaction from the first device. The processor is configured to authenticate the first device and one or more devices involved in the transaction for processing the transaction, and if the first device and all of the one or more devices are authenticated, process the transaction and transmit to the first device, through the I/O device, data relating to the processed transaction.

A system is disclosed. The system includes a first device in communication with the Internet that transmits a first transmission via the Internet including a request for processing a chip card transaction. The system also includes a server in communication with the Internet. The server receives the first transmission from the first device via the Internet, authenticates the first device and one or more devices involved in the transaction for processing the transaction. If the first device and all of the one or more devices are authenticated, the server processes the transaction and transmits to the first device, via the Internet, data relating to the processed transaction.

DETAILED DESCRIPTION OF THE PREFERRED EMBODIMENTS

The following description is intended to convey an understanding of the invention by providing a number of specific embodiments. It is understood, however, that the invention is not limited to these exemplary embodiments and details.

Figure 1:
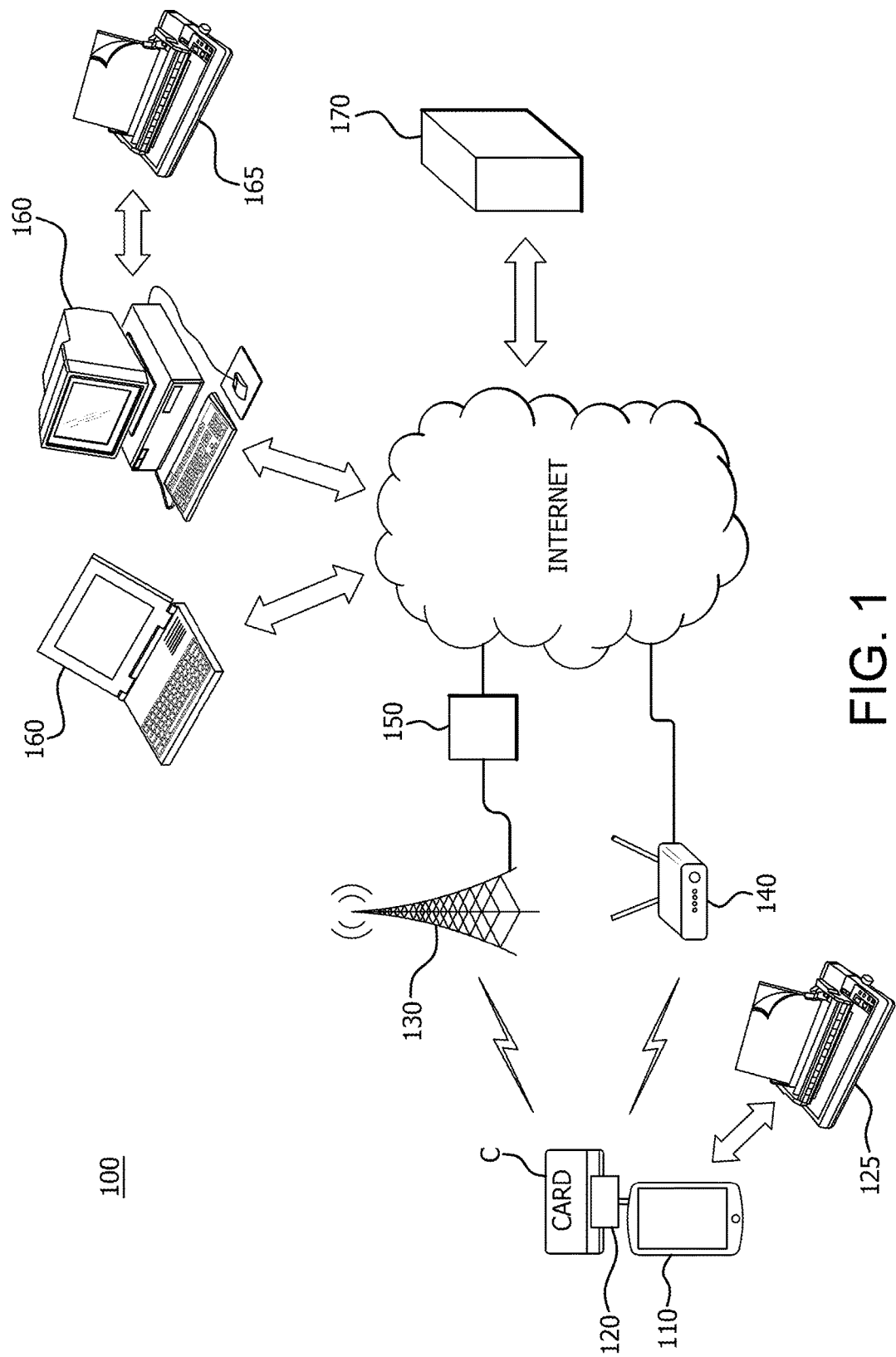
FIG. 1 is a schematic diagram of an example system for providing merchant services.

FIG. 1 is a schematic diagram of an example system 100 for providing merchant services. The system 100 includes a wireless device 110, including an electronic card reader 120 configured to read, for example, a credit/debit card C. The wireless device 110 may be in wireless communication with a cellular base station 130 and/or a wireless router 140 for connection to the Internet to transmit and receive data. Additionally, a printer 125 may be in communication with the wireless device 110 in order to receive printouts. The base station 130 may be connected to the Internet via a Core Network 150, (e.g., Radio Network Controller, Gateway, or the like), or any other connection scheme. Similarly, the wireless router 140 may be connected to the Internet via any connection. The system also includes one or more reseller devices 160 and a provider server 170, all of which are also connected to the Internet by any type of connection. A printer 165 may be in communication with the one or more reseller devices 160 in order to receive printouts.

Figure 2:
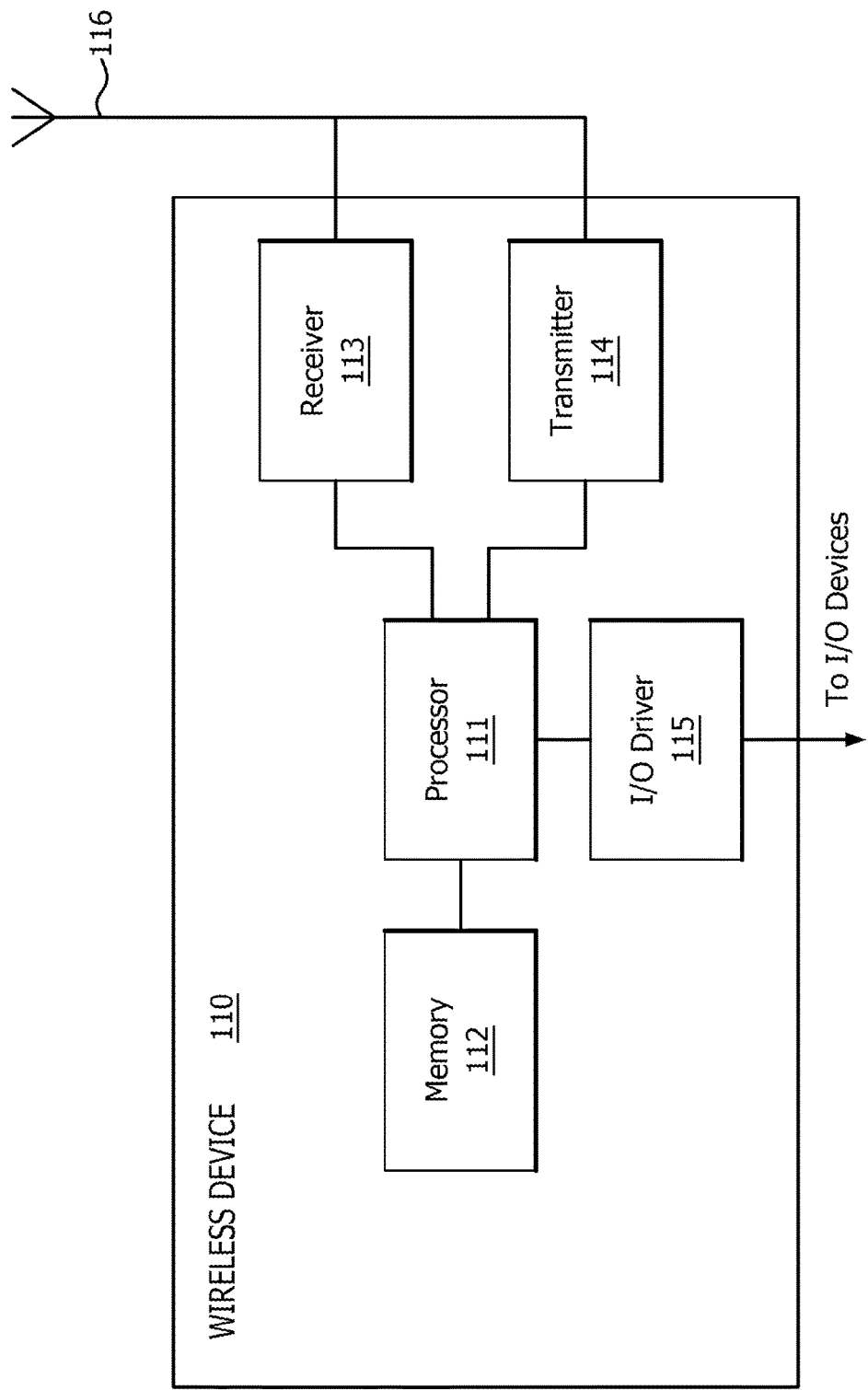
FIG. 2 is a schematic block diagram of an example wireless device operating in the example system of FIG. 1.

FIG. 2 is a schematic block diagram of an example wireless device 110 operating in the example system 100 of FIG. 1. The wireless device 110 includes a processor 111, a memory 112 in communication with the processor 111, a receiver 113 in communication with the processor 111, a transmitter 114 in communication with the processor 111, an Input/Output Device Driver (I/O driver) 115 in communication with the processor 111, and an antenna 116 in communication with the receiver 113 and the transmitter 114. The processor 111 is configured to receive data from the I/O driver 115, as well as to receive and send data to the memory 112. The processor is further configured to control receive data from the receiver 113 via the antenna 116, and to control the transmitter 114 to transmit data wireless via antenna 116. The I/O driver 115 is configured to be connected to, for example, the electronic card reader 120. The connection may include one or more of a USB port, audio jack connection, Bluetooth connection, or other connection.

Figure 3:
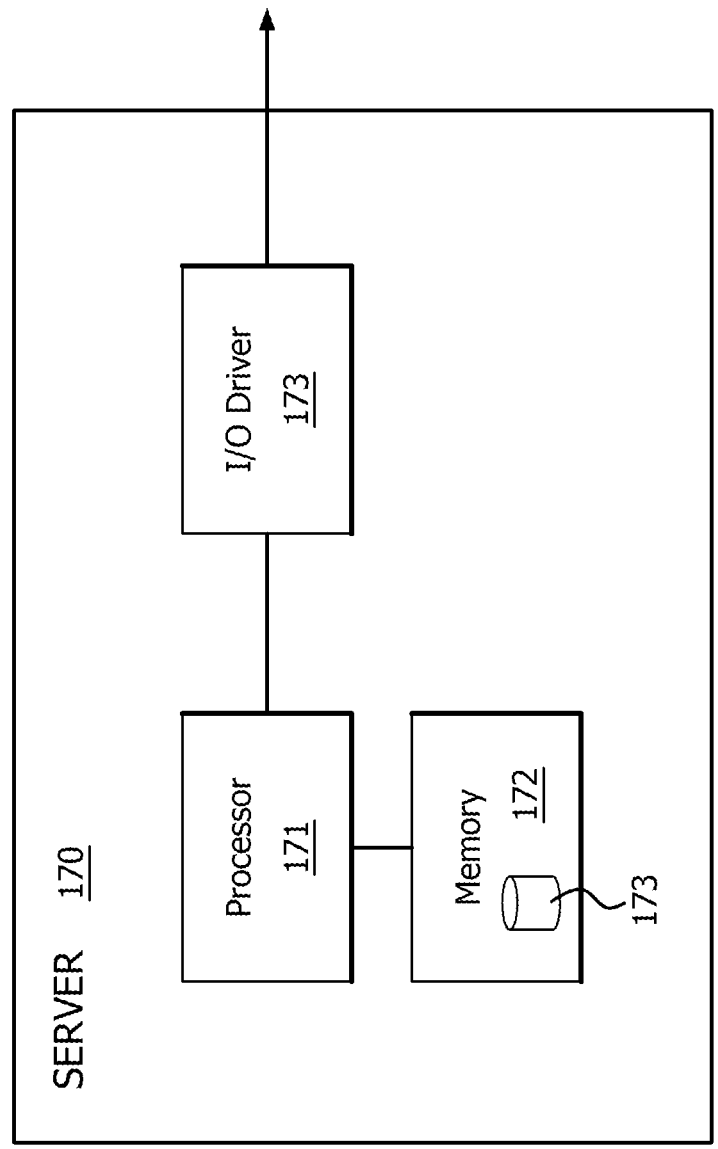
FIG. 3 is a schematic block diagram of an example server operating in the example system of FIG. 1.

FIG. 3 is a schematic block diagram of an example server 170 operating in the example system 100 of FIG. 1. The server 170 includes a processor 171, a memory 172 in communication with the processor 171, and an I/O driver 173 in communication with the processor. The memory 172 includes a database 173 for storing and extracting data. The I/O driver 173 transmits data to and receives data from the processor 171 for external transmission, (e.g., from and to the Internet). The server 170 may be utilized by a provider to provide merchant services via a reseller.

Figure 4:
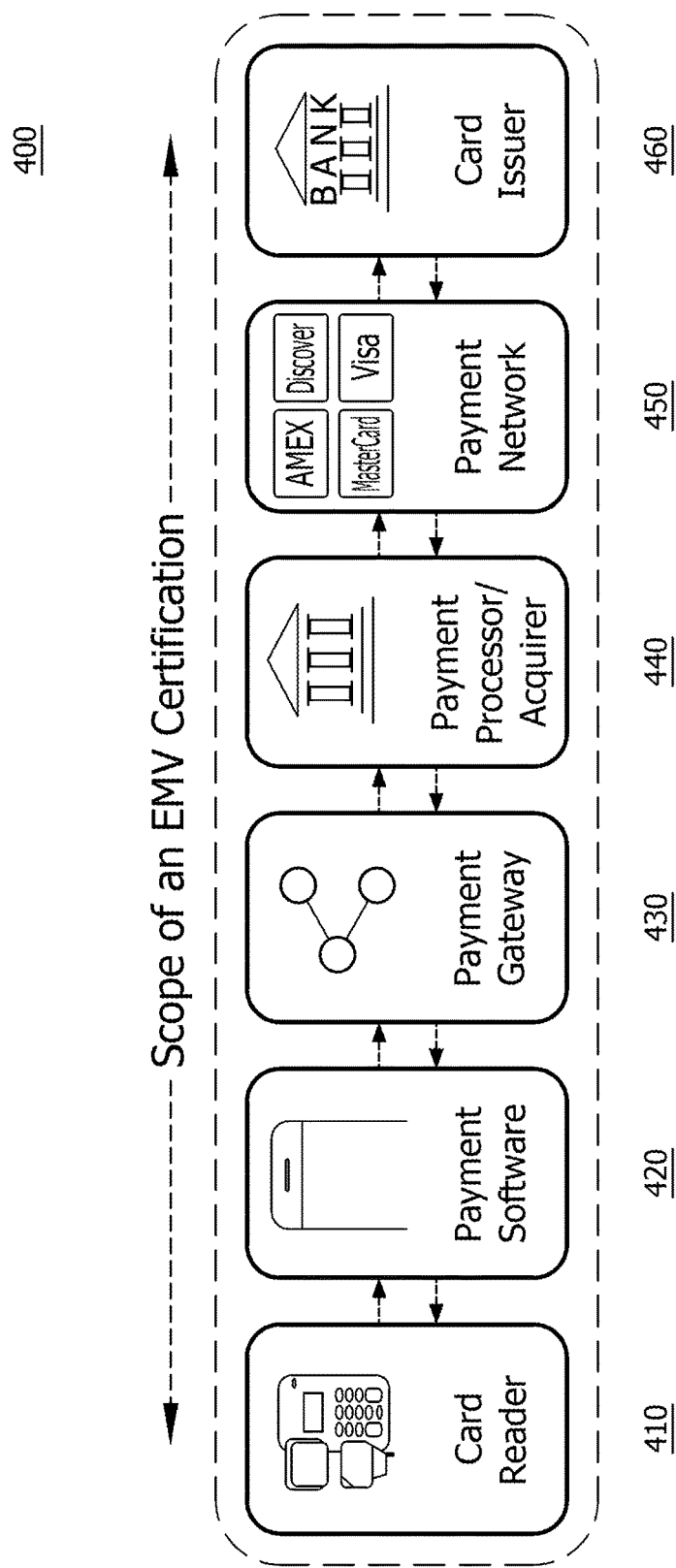
FIG. 4 is a schematic representation of devices/components in an example chip card certification transaction.

FIG. 4 is a schematic representation 400 of devices/components in an example chip card certification transaction. The representation depicted shows an example EMV certification, however, it can more generally relate to any chip card transaction. In the representation 400, each of the individual components in the value chain is a part of the transaction's scope. That is, each individual component and each combination of individual components is certified/authenticated. The transaction includes individually certifying a card reader component 410, a device that includes payment software 420, a payment gateway 430, a payment processor/acquirer 440, a payment network 450 and a card issuer 450. Each component communicates with neighboring components to perform a certification for an EMV transaction as part of a certified solution.

However, it may be the case where a merchant has one card reader 410 and wishes to add a different type or additional card reader. Alternatively, the merchant may desire to make some change to the mobile payment software 420. The merchant would need to get approval from both the payment processor/acquirer 440 and the respective payment networks 450 for each individual change.

Figure 5:
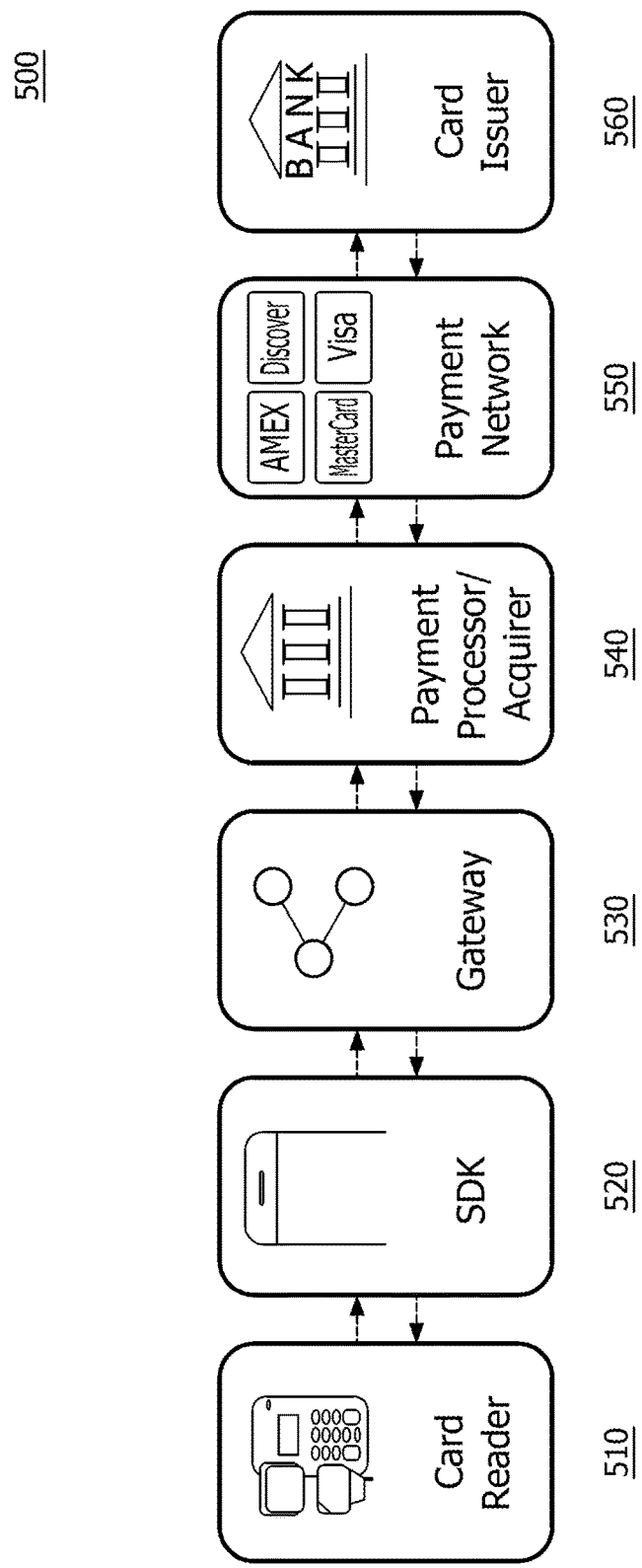
FIG. 5 is a schematic representation of devices/components in a pre-certified transaction.

FIG. 5 is a schematic representation 500 of devices/components in a pre-certified transaction. The components in representation 500 are similar to those in representation 400, except in representation 500, the device 520 that includes payment software also includes a pre-certification component, such as a software development kit (SDK). The SDK in device 520 is pre-certified and allows for the avoidance of the individual certification processes depicted in representation 400. The pre-certified SDK component may be embedded into the payment software of an application. Accordingly, conventional end to end certification would not be required for the combination of devices/components associated with this SDK. In other words, rather than the device 520 including payment software depicted in FIG. 4, (i.e., device 420), which would then need every device/component to be individually certified by, for example, the payment processor/acquirers 540, and the respective payment networks 550, the pre-certification for all devices/components in the transaction is leveraged to avoid the conventional end to end certification process. For example, the card reader 510 could be replaced with another card reader that utilizes a different protocol, but because it is pre-certified when utilized in conjunction with the pre-certified SDK in device 520, additional certifications are avoided to process transactions.

Figure 6:
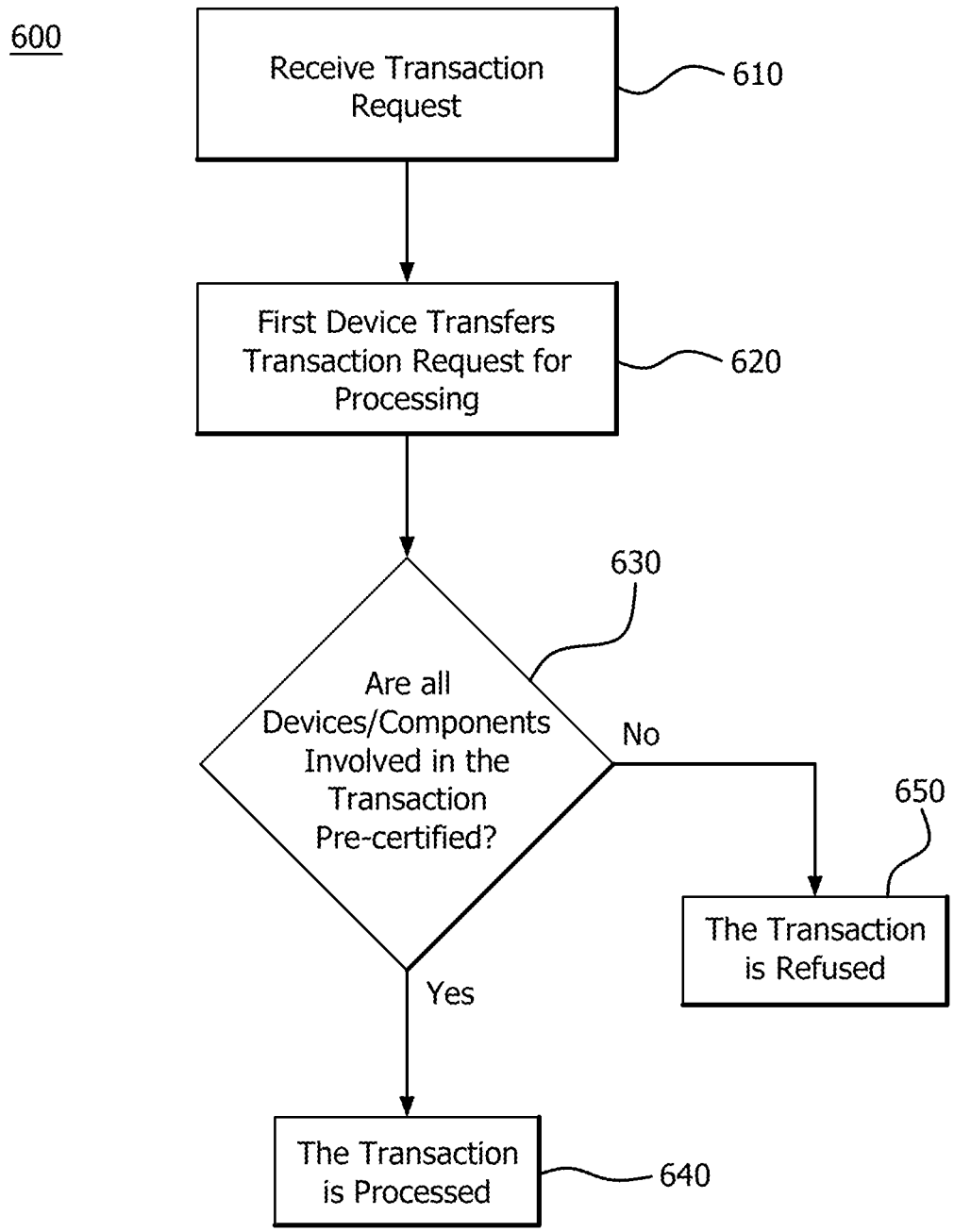
FIG. 6 is a flow diagram of an example method for providing a pre-certified transaction for chip card transactions.

FIG. 6 is a flow diagram of an example method 600 for providing a pre-certified transaction for chip card transactions. In step 610, a chip card transaction is requested at a first device. For example, a customer may insert a chip card into a card reading device, (e.g., card reader 510). The first device, (e.g., card reading device), then transfers, or transmits, the transaction request for processing (step 620).

If all the devices/components involved in the transaction are pre-certified for transaction processing (step 630), for example, through integration of an SDK into the application of device 520, then the transaction is processed in step 640. If any of the components are not pre-certified, then the transaction is refused, or rejected, (step 650). For example, a module, (e.g., an iOS application, Android application, etc.), can be integrated by a developer for the device 520 to utilize the pre-certification. Such an application module is pre-certified such that the device 520 does not require individual end-to-end certifications, (e.g., Visa ADVT, MasterCard M-TIP), to be sought. Additionally, such an application module can be embedded within client's applications on the device 520 and can be developed with custom/integrated reporting and application experiences.

Once the components in the transaction are pre-certified, by a server such as server 170 for example, the server may transit data relating to the processed transaction to the device requesting the transaction be processed, (e.g., device 520).

Although features and elements are described above in particular combinations, one of ordinary skill in the art will appreciate that each feature or element can be used alone or in any combination with the other features and elements.

For example, a reporting application program interface (API) or callback may be included in the device 520 and in communication with the gateway 530 to extract historical transactions and batch data into a customer's back-end reporting system.

Furthermore, application modules may be performed on consumer-grade/commodity mobile platforms, (e.g., iOS and Android), rather than purpose built payment terminals. Additionally, hardware may be de-coupled from the software that manages the transaction. The application modules may be embedded within a client's application or exist separate from it.

The application module may use one SDK and communicate with multiple different hardware devices in a common language. That is, multiple different card reader types/versions could be used. Accordingly, one SDK may be used to communicate with multiple different merchant acquirer processing platforms in a common language. The logic in the library, (e.g., iOS, Android), is in a software based module which gets pre-certified. Accordingly, every application for use in, for example, iOS and Android systems does not need to be certified. Additionally, although the methods and apparatus described above can be employed in a mobile merchant environment, they can also be employed in any type of merchant environment.

Different versions, (e.g., iOS, Android), of an example application module may also be used with a common architecture. The programming languages may be different, however. The processing module may build the software layer that interacts and sends transactions. Accordingly, security of the end-to-end chip card transaction is managed, and sensitive card data is not accessible to an application developer, which reduces liability for ensuring compliance with payment card industry data security standards and reduces the investment on security that is required.

What is claimed is:

1. A method, implemented in a server, for pre-certifying a chip card transaction, comprising:

receiving, by the server, a request for processing the chip card transaction from a first device;

authenticating the first device and one or more devices involved in the transaction for processing the transaction;

if the first device and all of the one or more devices are authenticated, processing the transaction;

transmitting data relating to the processed transaction to the first device; and providing pre-certification information in the first device pre-certifying the first device and all of the one or more devices.

2. The method of claim 1, further comprising rejecting the transaction if the first device and all of the one or more devices are not authenticated, and transmitting data indicating the transaction is not processed to the first device.

3. The method of claim 1 wherein the received request includes the pre-certification information for pre-certifying the first device and all of the one or more devices.

4. The method of claim 3 wherein the authenticating of the one or more devices is based upon the received request including the pre-certification information.

5. An apparatus, comprising:
a processor;
an input/output (I/O) driver; and
a memory;
wherein the processor is configured to receive a first transmission from a first device from the I/O driver via the Internet, the first transmission including a request for processing a chip card transaction from the first device, authenticate the first device and one or more devices involved in the transaction for processing the transaction, and if the first device and all of the one or more devices are authenticated, process the transaction and transmit to the first device, through the I/O device, data relating to the processed transaction, and wherein pre-certification information is included in the first device pre-certifying the first device and all of the one or more devices.

6. The apparatus of claim 5 wherein the processor is further configured to reject the transaction if the first device and all of the one or more devices are not authenticated, and transmit to the first device, through the I/O device, data indicating the transaction is not processed.

7. The apparatus of claim 5 wherein the received request includes the pre-certification information for pre-certifying the first device and all of the one or more devices.

8. The apparatus of claim 7 wherein the authenticating of the one or more devices is based upon the received request including the pre-certification information.

9. A system, comprising:
a first device in communication with the Internet, the first device configured to transmit a first transmission via the Internet including a request for processing a chip card transaction; and
a server in communication with the Internet, the server configured to receive the first transmission from the first device via the Internet, the first transmission including a request for processing a chip card transaction from the first device, authenticate the first device and one or more devices involved in the transaction for processing the transaction, and if the first device and all of the one or more devices are authenticated, process the transaction and transmit to the first device, via the Internet, data relating to the processed transaction, wherein the server further comprises a processor, a memory in communication with the processor, and an input/output (I/O) driver in communication with the processor, wherein the processor receives the first transmission via the I/O driver, and
wherein pre-certification information is included in the first device pre-certifying the first device and all of the one or more devices.

10. The system of claim 9 wherein the server is further configured to reject the transaction if the first device and all of the one or more devices are not authenticated, and transmit to the first device, through the I/O device, data indicating the transaction is not processed.

11. The system of claim 9 wherein the received request includes the pre-certification information for pre-certifying the first device and all of the one or more devices.

12. The system of claim 11 wherein the authenticating of the one or more devices is based upon the received request including the pre-certification information.

* * * * *